(12) United States Patent
Sakamoto

(10) Patent No.: US 11,345,386 B2
(45) Date of Patent: May 31, 2022

(54) STEERING COLUMN DEVICE

(71) Applicant: JTEKT CORPORATION, Osaka (JP)

(72) Inventor: Kota Sakamoto, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/224,547

(22) Filed: Apr. 7, 2021

(65) Prior Publication Data

US 2021/0323597 A1 Oct. 21, 2021

(30) Foreign Application Priority Data

Apr. 15, 2020 (JP) .............................. JP2020-072770

(51) Int. Cl.
*B62D 1/16* (2006.01)

(52) U.S. Cl.
CPC ...................................... *B62D 1/16* (2013.01)

(58) Field of Classification Search
CPC ........ B62D 1/16; B62D 1/189; B62D 5/0409; B62D 5/0406; B62D 1/166; B62D 5/0415; F16H 57/029; F16H 57/031
See application file for complete search history.

(56) References Cited

U.S. PATENT DOCUMENTS

| | | | | |
|---|---|---|---|---|
| 4,415,166 A | * | 11/1983 | Beia | F16J 15/441 277/925 |
| 5,445,237 A | * | 8/1995 | Eda | B62D 5/0409 180/444 |
| 5,503,239 A | * | 4/1996 | Shimizu | B62D 3/123 74/393 |
| 2012/0043156 A1 | * | 2/2012 | Ishige | B62D 5/0409 180/444 |
| 2021/0116031 A1 | * | 4/2021 | Moriyama | B62D 1/02 |
| 2021/0269084 A1 | * | 9/2021 | Hamaguchi | B62D 5/0421 |

FOREIGN PATENT DOCUMENTS

| | | | | |
|---|---|---|---|---|
| EP | 2177420 A1 | * | 4/2010 | ............ B62D 1/166 |
| JP | 2009120016 A | * | 6/2009 | |
| JP | 2012-040981 A | | 3/2012 | |
| JP | 2016010998 A | * | 1/2016 | |
| JP | 2016022794 A | * | 2/2016 | |
| WO | WO-2005073583 A1 | * | 8/2005 | ............... B62D 1/16 |

* cited by examiner

*Primary Examiner* — Paul N Dickson
*Assistant Examiner* — Kurtis Nielson
(74) *Attorney, Agent, or Firm* — Oliff PLC

(57) ABSTRACT

A steering column device includes a steering shaft; and a steering column. The steering column includes a housing, a cover, and a sealing member. The housing includes an inclined portion having an inclined surface with an inside diameter increasing from a first side to a second side, the inclined surface contacting the sealing member from the first side. The cover includes a facing portion having a facing surface contacting the sealing member from the second side, and an insertion portion having an outer peripheral surface contacting the sealing member from an inner peripheral side. The sealing member is accommodated in an accommodation space defined by the inclined surface, the facing surface, and the outer peripheral surface. An escape space continuous with the accommodation space is provided between the housing and the cover, the escape space being located closer to the first side than the inclined surface is.

5 Claims, 3 Drawing Sheets

STEERING COLUMN DEVICE

CROSS-REFERENCE TO RELATED APPLICATION

This application claims priority to Japanese Patent Application No. 2020-072770 filed on Apr. 15, 2020, incorporated herein by reference in its entirety.

BACKGROUND

1. Technical Field

The disclosure relates to a steering column device.

2. Description of Related Art

As described in Japanese Unexamined Patent Application Publication No. 2012-40981 (JP 2012-40981 A), for example, there has been a steering column device including an actuator configured to decelerate rotation of a motor and transmit the rotation to a steering shaft. Such a steering column device includes a housing in which a speed reducer is accommodated, and a cover configured to close an opening of the housing. A sealing member such as an O-ring is provided between the housing and the cover so as to restrain leakage of grease filled in the housing.

SUMMARY

In recent years, steering column devices have been required to have further higher sealing performance. Here, in order to improve the sealing performance, it is necessary to increase the compression amount of a sealing member.

However, when the compression amount of the sealing member is to be increased, the ratio of the volume of the sealing member to the volume of a space between the housing and the cover, where the sealing member is accommodated, is increased, that is, a filling factor is increased. Accordingly, for example, when the sealing member expands under a high temperature environment, the filling factor becomes excessive, and thus, an excessive load may be applied to the sealing member.

The disclosure provides a steering column device that makes it possible to reduce the possibility that an excessive load is applied to a sealing member, and to improve sealing performance.

A steering column device according to one aspect of the disclosure includes a steering shaft to which a steering wheel is fixed; and a steering column configured to support the steering shaft such that the steering shaft is rotatable. The steering column includes a housing opened in an axial direction of the steering column, a cover configured to close an opening of the housing, and a sealing member configured to provide sealing between the housing and the cover. A first side in the axial direction of the steering column is a side where the housing is located relative to the cover, and a second side in the axial direction of the steering column is a side where the cover is located relative to the housing. The housing includes an inclined portion having an inclined surface with an inside diameter increasing from the first side to the second side, the inclined surface contacting the sealing member from the first side. The cover includes a facing portion having a facing surface contacting the sealing member from the second side, and an insertion portion having an outer peripheral surface contacting the sealing member from an inner peripheral side. The sealing member is accommodated in an accommodation space defined by the inclined surface, the facing surface, and the outer peripheral surface. An escape space continuous with the accommodation space is provided between the housing and the cover, the escape space being located closer to the first side than the inclined surface is.

In the above configuration, the escape space continuous with the accommodation space is provided. Accordingly, for example, when the sealing member expands under a high-temperature environment, the sealing member enters the escape space. Thus, it is possible to reduce the possibility that an excessive load is applied to the sealing member from the inclined surface, the facing surface, and the outer peripheral surface that define the accommodation space. Since the escape space is provided closer to the first side than the inclined surface contacting the sealing member from the first side, it is possible to restrain a decrease in the compression amount of the sealing member by providing the escape space. Accordingly, it is possible to reduce the possibility that an excessive load is applied to the sealing member and to increase the compression amount of the sealing member. This makes it possible to improve sealing performance.

In the steering column device according to the above aspect, the escape space may be provided by cutting out a part of the insertion portion. With the above configuration, in comparison with a case where, for example, a part of the inner peripheral surface of the housing is cut out, the part being continuous with the inclined surface, it is possible to reduce the possibility that a distal end of the insertion portion is caught on the housing at the time when the cover is fitted. Therefore, it is possible to restrain a decrease in ease with which the cover is fitted to the housing (i.e., it is possible to restrain a decrease in ease in fitting the cover to the housing).

In the steering column device according to the above aspect, the shape of the facing surface may be a flat shape perpendicular to the axial direction. In the steering column device according to the above aspect, the shape of the outer peripheral surface may be a cylindrical shape having an outside diameter uniform along the axial direction.

With each of the above configurations, it is possible to easily control the compression amount of the sealing member.

In the steering column device according to the above aspect, the shape of the outer peripheral surface may be a conical shape having an outside diameter decreasing from the first side toward the second side.

With the above configuration, when the sealing member expands, the sealing member easily enters the escape space. This accordingly makes it possible to appropriately reduce the possibility that an excessive load is applied to the sealing member.

With the above aspect of the disclosure, it is possible to reduce the possibility that an excessive load is applied to the sealing member and to improve the sealing performance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of a steering column device will be described below with reference to the drawings. A steering column device 1 according to the present embodiment constitutes a part of an electric power steering system. The steering column device 1 is provided in a vehicle such that its axial direction extends along the vehicle front-rear direction. Therefore, in the following description, the right side in FIG. 1 is the front side in the vehicle front-rear direction, and the left side in FIG. 1 is the rear side in the vehicle front-rear direction.

Figure 1:
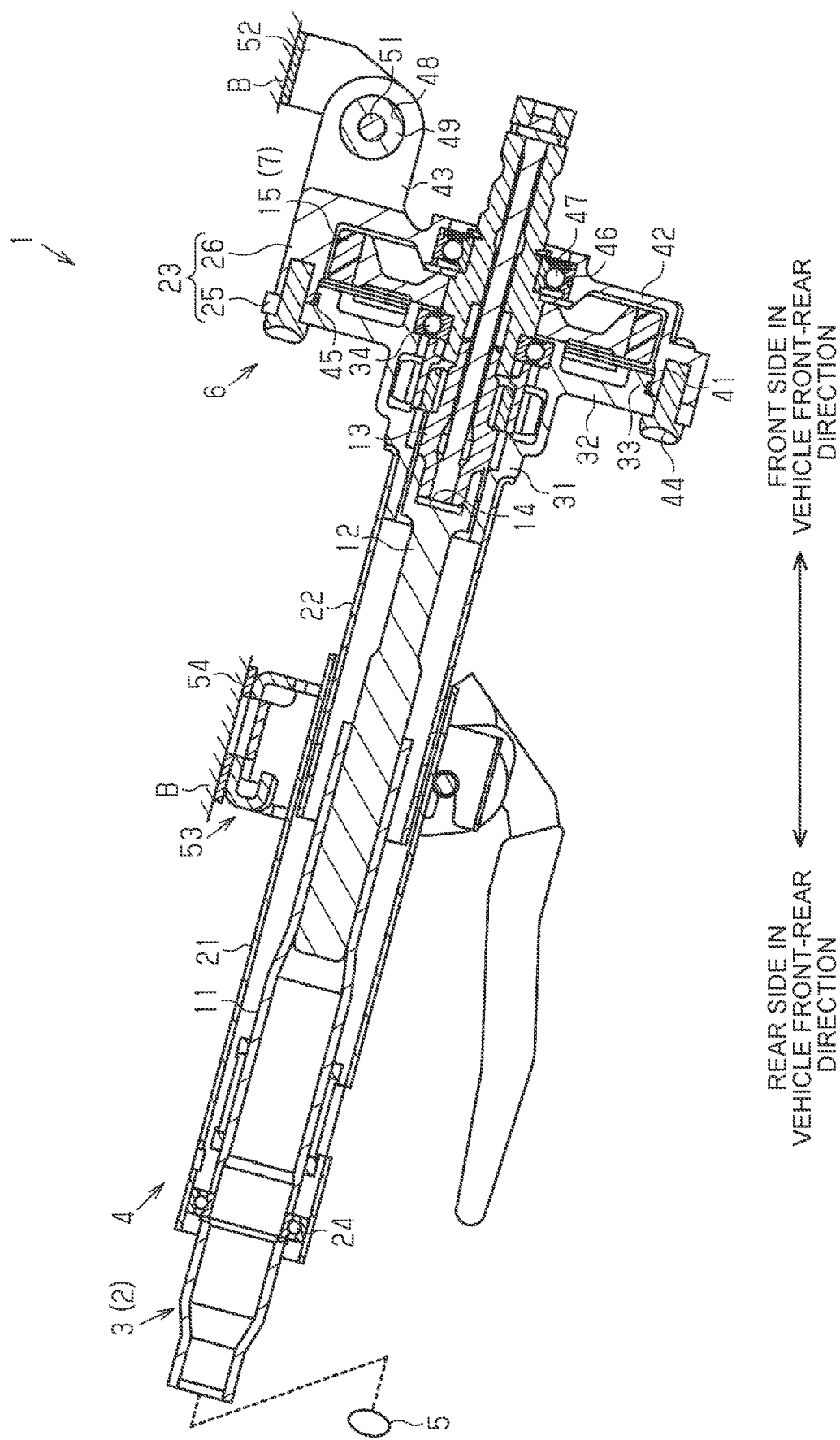
FIG. 1 is a sectional view of a steering column device according to an embodiment along its axial direction.

As illustrated in FIG. 1, the steering column device 1 includes a column shaft 3 constituting a part of a steering shaft 2, and a steering column 4 in which the column shaft 3 is rotatably accommodated. A steering wheel 5 is connected to a rear end portion of the column shaft 3 in the vehicle front-rear direction. In the meantime, an intermediate shaft constituting a part of the steering shaft 2 is connected to a front end portion of the column shaft 3 in the vehicle front-rear direction. When rotation of the steering shaft 2 along with a steering operation is converted into a reciprocating motion of a rack shaft in a rack-and-pinion mechanism (not shown), the steering angle of steered wheels is changed.

The steering column device 1 has a power assistance function to provide an assist force to assist steering performed by a driver and a tilt adjustment function to adjust the height position of the steering wheel 5.

More specifically, the steering column device 1 includes an EPS actuator 6 using a motor (not shown) as a drive source. The EPS actuator 6 provides an assist force by decelerating rotation of the motor using a speed reducer 7 and transmitting the decelerated rotation to the column shaft 3. Note that a worm speed reducer is employed as the speed reducer 7.

The column shaft 3 includes an upper shaft 11, an intermediate shaft 12, and a drive shaft 13. The steering wheel 5 is connected to a rear end portion of the upper shaft 11 in the vehicle front-rear direction. The shape of the upper shaft 11 is a tubular shape. The intermediate shaft 12 is splined to an inner periphery of the upper shaft 11, and thus, the upper shaft 11 is connected to the intermediate shaft 12 such that the upper shaft 11 is rotatable integrally with the intermediate shaft 12. A fitting hole 14 is formed in a front end portion of the intermediate shaft 12 in the vehicle front-rear direction. The drive shaft 13 is press-fitted to the fitting hole 14, and thus, the intermediate shaft 12 is connected to the drive shaft 13 such that the intermediate shaft 12 is rotatable integrally with the drive shaft 13. A worm wheel 15 constituting the speed reducer 7 is fitted to the drive shaft 13 such that the worm wheel 15 is rotatable integrally with the drive shaft 13. Accordingly, when the motor drives the worm wheel 15 such that the worm wheel 15 rotates, an assist force is provided to the drive shaft 13.

The steering column 4 includes an outer tube 21, an inner tube 22, and an actuator housing 23. The outer tube 21 supports the upper shaft 11 such that the upper shaft 11 is rotatable, via a bearing 24. The inner tube 22 is fitted into an inner periphery of the outer tube 21 from the front side in the vehicle front-rear direction. The actuator housing 23 is fixed to a front end portion of the inner tube 22 in the vehicle front-rear direction. The drive shaft 13 and the speed reducer 7 are accommodated in the actuator housing 23. In order to secure a smooth operation of the speed reducer 7, grease (not shown) is filled in the actuator housing 23.

The actuator housing 23 includes a tube housing 25 as a cover, and a gear housing 26 as a housing. The tube housing 25 includes a tubular portion 31, a closing portion 32, and an insertion portion 33. The tube housing 25 supports the drive shaft 13 such that the drive shaft 13 is rotatable, via a bearing 34 provided on the front side of the tubular portion 31 in the vehicle front-rear direction. A rear end portion of the tubular portion 31 in the vehicle front-rear direction is press-fitted to an inner periphery of the inner tube 22 from the front side in the vehicle front-rear direction. The shape of the closing portion 32 is a wide toric shape (i.e., a wide annular shape). The closing portion 32 extends radially outwardly from a front end portion of the tubular portion 31 in the vehicle front-rear direction. The shape of the insertion portion 33 is a toric shape (i.e., annular shape) having an outside diameter smaller than that of the closing portion 32. The insertion portion 33 projects further forward in the vehicle front-rear direction from a front end portion of the closing portion 32 in the vehicle front-rear direction.

The shape of the gear housing 26 is a cylindrical shape opened rearward in the vehicle front-rear direction. The gear housing 26 includes an open end 41, a closed end 42, and a support portion 43. The open end 41 faces a part of the closing portion 32, the part being closer to an outer peripheral side than the insertion portion 33 is. The tube housing 25 and the gear housing 26 are fastened to each other by fastening bolts 44 in a state where the insertion portion 33 is inserted into an inner periphery of the open end 41. A sealing member 45 such as an O-ring is provided between the tube housing 25 and the gear housing 26 and restrains leakage of the grease inside the actuator housing 23. The material of the sealing member 45 is, for example, nitrile rubber or hydrogenated nitrile rubber. A sealing structure according to the present embodiment will be described later.

The shape of the closed end 42 is a discoidal shape. The closed end 42 has an insertion hole 46 extending through the closed end 42 in the axial direction. The gear housing 26 supports the drive shaft 13 such that the drive shaft 13 is rotatable via a bearing 47 provided on an inner periphery of the insertion hole 46.

The support portion 43 projects rearward in the vehicle front-rear direction from the closed end 42. The support portion 43 has a shaft hole 48 extending through the support portion 43 in the vehicle width direction. A tilt bolt 51 is inserted into the shaft hole 48 of the support portion 43 via a cylindrical collar 49. The tilt bolt 51 is screwed to a lower bracket 52 fixed to a front portion of a vehicle body B in the vehicle front-rear direction. Thus, the steering column 4 is supported tiltably around the tilt bolt 51.

The outer tube 21 is supported by an upper bracket 54 fixed to a rear portion of the vehicle body B in the vehicle front-rear direction via a support mechanism 53. The support mechanism 53 is configured to allow the steering column 4 to tilt around the tilt bolt 51 within an adjustable range set in advance and is configured to hold the steering column 4 at a given position within the adjustable range.

Thus, the height position of the steering column 4 is adjustable by changing the position of the steering wheel 5 in a tilt direction generally along the vehicle up-down direction, more strictly, in a direction of tilting around the tilt bolt 51.

Next will be described the sealing structure according to the present embodiment. In the following description, in the axial direction of the steering column 4, a side where the gear housing 26 is located relative to the tube housing 25 is referred to as a first side, and a side where the tube housing 25 is located relative to the gear housing 26 is referred to as a second side. That is, the front side in the vehicle front-rear direction is referred to as the first side, and the rear side in the vehicle front-rear direction is referred to as the second side.

Figure 2:
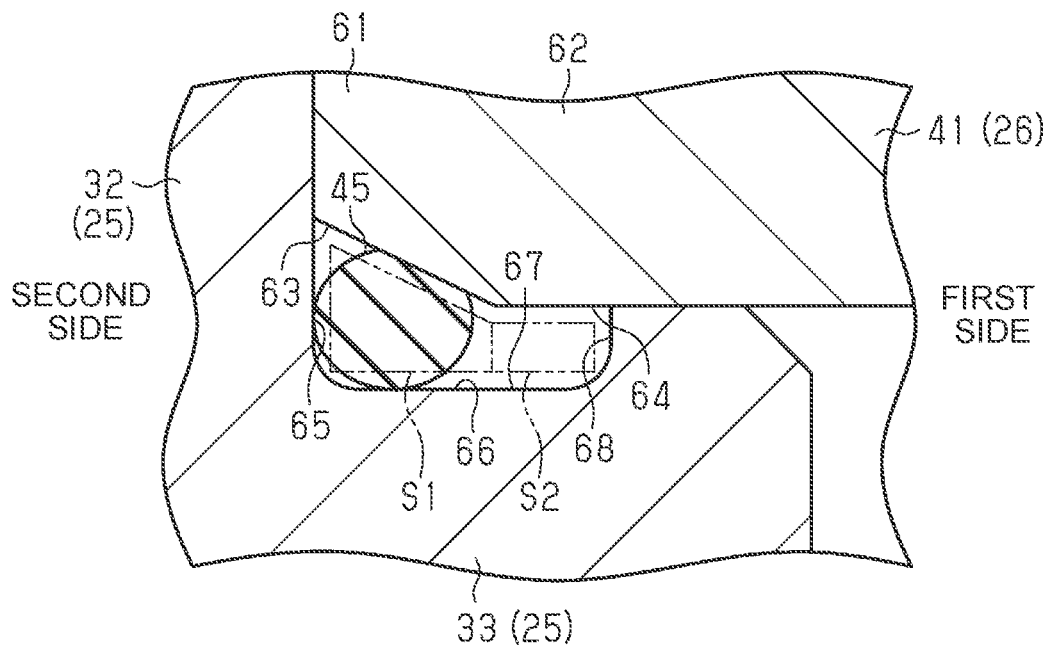
FIG. 2 is an enlarged sectional view illustrating a sealing structure between a gear housing and a tube housing in the steering column device according to the embodiment.

As illustrated in FIG. 2, an accommodation space S1 and an escape space S2 continuous with the accommodation space S1 are formed (i.e., provided) between the open end 41 of the gear housing 26 and the closing portion 32 and the insertion portion 33 of the tube housing 25. The accommodation space S1 and the escape space S2 are annular spaces extending over the whole region of the steering column 4 in the circumferential direction. The sealing member 45 in a compressed state is accommodated in the accommodation space S1. Note that, for the purpose of this description, the accommodation space S1 and the escape space S2 both indicated by an alternate long and two short dashes line in FIG. 2 are illustrated as spaces smaller than their actual sizes.

More specifically, the open end 41 includes an inclined portion 61 and a fitting portion 62 continuous with a first-side portion of the inclined portion 61, the first-side portion being located on the first side. The inclined portion 61 includes an inclined surface 63 having an inside diameter increasing from the first side toward the second side. The inclined surface 63 contacts a sealing member 45 from the first side. The fitting portion 62 includes an inner peripheral surface 64 having an inside diameter that is uniform along the axial direction. The inside diameter of the inner peripheral surface 64 is equal to a minimum value of the inside diameter of the inclined surface 63.

The closing portion 32 has a facing surface 65 facing the inclined surface 63 in the axial direction. The facing surface 65 contacts the sealing member 45 from the second side. That is, in the present embodiment, the closing portion 32 may be regarded as a facing portion. The shape of the facing surface 65 is a flat shape perpendicular to the axial direction.

A mounting groove 66 in which the sealing member 45 is provided is formed (i.e., provided) on an outer peripheral surface of the insertion portion 33. The mounting groove 66 is formed by cutting out a part of the insertion portion 33. The mounting groove 66 is formed in an annular shape extending over the whole circumference of the insertion portion 33. A bottom face 67 of the mounting groove 66 contacts the sealing member 45 from an inner peripheral side. That is, the bottom face 67 may be regarded as an outer peripheral surface.

The mounting groove 66 is located close to an end portion of the insertion portion 33 on the second side such that the bottom face 67 is continuous with the facing surface 65. The width of the mounting groove 66 along the axial direction is set to be longer than the length of the inclined surface 63 along the axial direction. That is, a side face 68, on the first side, of the mounting groove 66 is located closer to the first side than the inclined surface 63 is. Thus, the bottom face 67 of the mounting groove 66 faces the entire inclined surface 63 in the radial direction and also faces a part of the inner peripheral surface 64.

The accommodation space S1 is defined by the inclined surface 63, the facing surface 65, and the bottom face 67. The escape space S2 is defined by the bottom face 67, the side face 68, and the inner peripheral surface 64. Thus, the escape space S2 is continuous with the accommodation space S1 and is located closer to the first side than the inclined surface 63 is. Further, the mounting groove 66 is formed by cutting out a part of the insertion portion 33 as described above, and therefore, the escape space S2 is formed by cutting out a part of the insertion portion 33. At normal temperature, the entire sealing member 45 is accommodated in the accommodation space S1 and exhibits desired sealing performance in a state where the sealing member 45 is compressed by the inclined surface 63, the facing surface 65, and the bottom face 67.

Note that the actuator housing 23 is assembled by inserting the insertion portion 33 of the tube housing 25 into the inner periphery of the open end 41 of the gear housing 26 in a state where the sealing member 45 is provided in the mounting groove 66.

The following describes operations and effects of the present embodiment. (1) A case is assumed in which the temperature of the sealing member 45 reaches a high temperature due to a change in a temperature around the steering column device 1, for example. In this case, the sealing member 45 expands, and thus, the volume of the sealing member 45 increases. In the meantime, the volume of the accommodation space S1 hardly changes in comparison with the volume of the sealing member 45. As a result, the ratio of the volume of the sealing member 45 to the volume of the accommodation space S1 increases.

Figure 3:
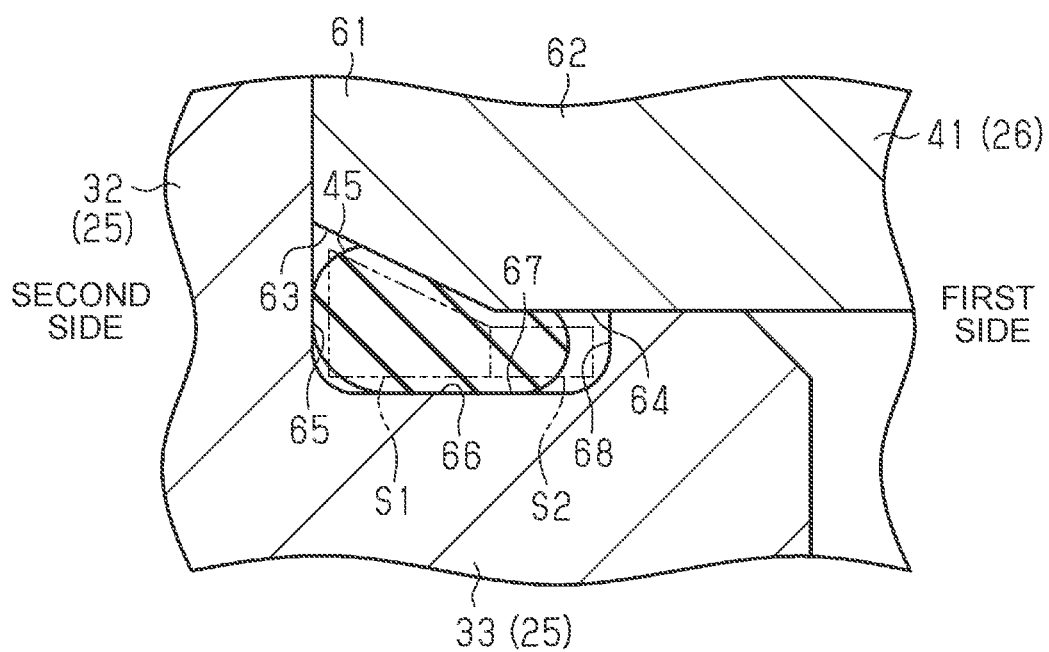
FIG. 3 is a schematic view illustrating a state where a sealing member expands in the sealing structure according to the embodiment.

Here, in the present embodiment, the escape space S2 is formed between the tube housing 25 and the gear housing 26, the escape space S2 being continuous with the accommodation space S1 and located closer to the first side than the inclined surface 63 is. Accordingly, as illustrated in FIG. 3, when the sealing member 45 expands, the sealing member 45 enters the escape space S2. Thus, it is possible to reduce the possibility that an excessive load is applied to the sealing member 45 from the inclined surface 63, the facing surface 65, and the bottom face 67 that define the accommodation space S1. Further, since the escape space S2 is provided further closer to the first side than the inclined surface 63 contacting the sealing member 45 from the first side, it is possible to restrain a decrease in the compression amount of the sealing member 45 by forming the escape space S2. Accordingly, it is possible to reduce the possibility that an excessive load is applied to the sealing member 45, and to increase the compression amount of the sealing member 45. This makes it possible to improve the sealing performance.

Further, when the sealing member 45 expands and enters the escape space S2, a part of the sealing member 45 moves toward the first side, that is, toward the inside of the gear housing 26. Thus, the sealing member 45 pushes back the grease filled in the gear housing 26 into the gear housing 26, thereby making it possible to more appropriately restrain the leakage of the grease.

(2) The escape space S2 is formed by cutting out a part of the insertion portion 33. Accordingly, in comparison with a case where the inner peripheral surface 64 continuous with the inclined surface 63 is cut out, for example, it is possible to reduce the possibility that a distal end of the insertion portion 33 is caught on the gear housing 26 at the time when the tube housing 25 is fitted. Thus, it is possible to restrain a decrease in ease with which the tube housing 25 is fitted to the gear housing 26 (i.e., it is possible to restrain a decrease in ease in fitting the tube housing 25 to the gear housing 26).

(3) The shape of the facing surface 65 is a flat shape perpendicular to the axial direction, and the shape of the bottom face 67 of the mounting groove 66 is a cylindrical shape having the outside diameter that is uniform along the axial direction. Accordingly, the compression amount of the sealing member 45 can be controlled easily.

Figure 4:
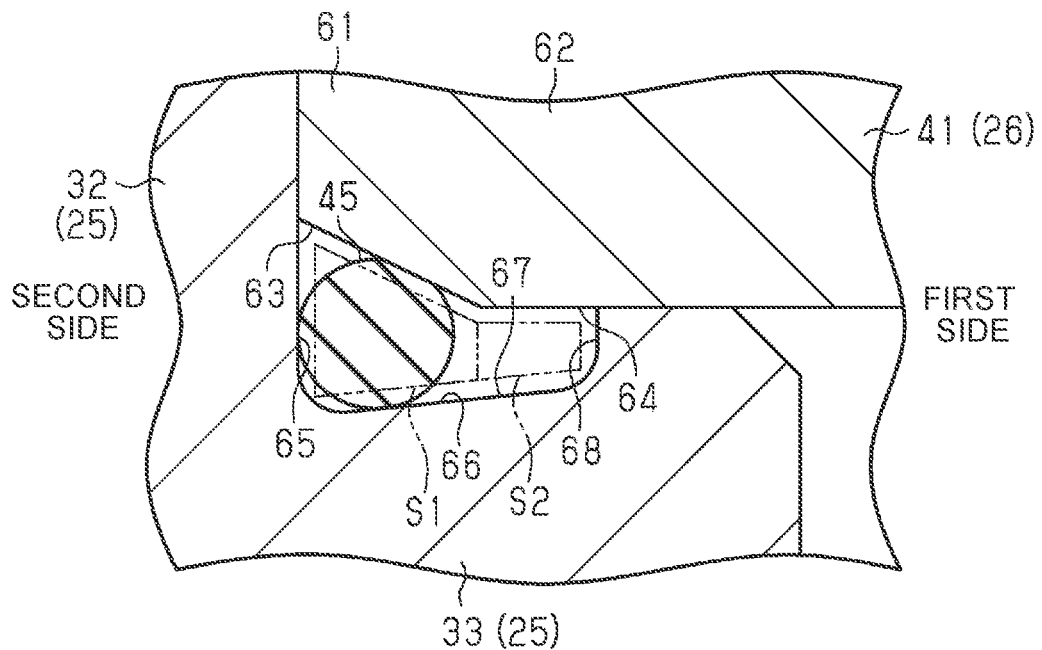
FIG. 4 is an enlarged sectional view illustrating a sealing structure according to a modification.

The present embodiment may be carried out by making changes to the embodiment as stated below. The present embodiment and the following modifications can be carried out in combination with each other as long as they do not cause any technical inconsistencies. In the above embodiment, the bottom face 67 of the mounting groove 66 is formed in a cylindrical shape having the outside diameter that is uniform along the axial direction. However, the disclosure is not limited to this. For example, as illustrated in FIG. 4, the shape of the bottom face 67 may be a conical shape having the outside diameter decreasing from the first side toward the second side. In this configuration, when the sealing member 45 expands, the sealing member 45 easily enters the escape space S2. Thus, it is possible to appropriately reduce the possibility that an excessive load is applied to the sealing member 45. Further, the shape of the bottom face 67 may be a conical shape having the outside diameter increasing from the first side toward the second side, for example.

In the above embodiment, the facing surface 65 of the closing portion 32 is formed in a flat shape perpendicular to the axial direction. However, the disclosure is not limited to this. For example, the shape of the facing surface 65 may be a flat shape diagonally intersecting with the axial direction.

Figure 5:
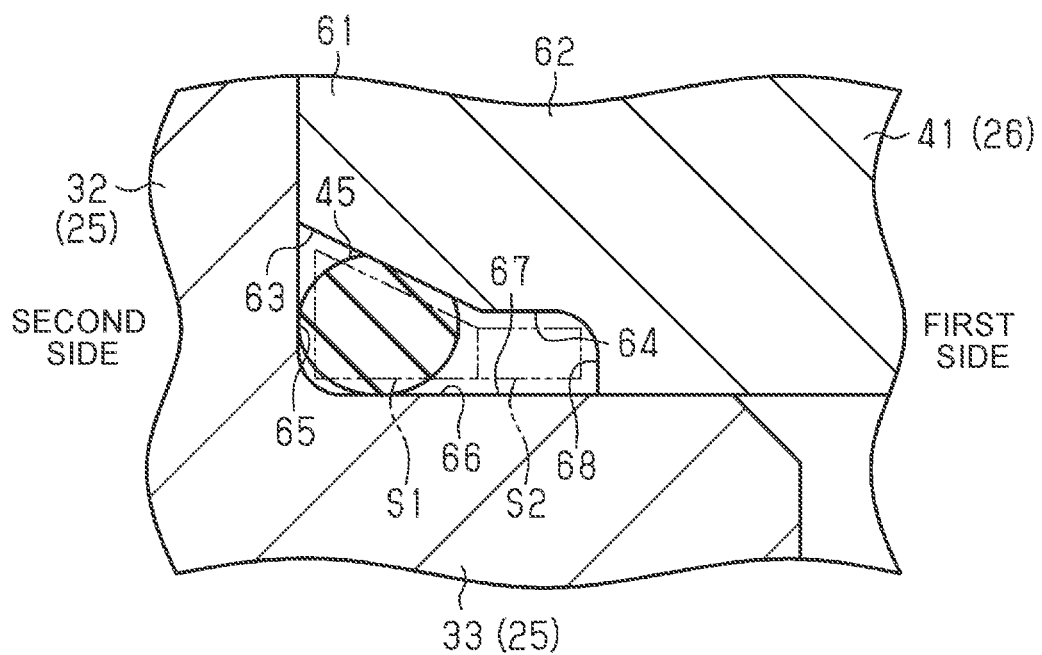
FIG. 5 is an enlarged sectional view illustrating a sealing structure according to a modification.

—In the above embodiment, the escape space S2 is formed by cutting out a part of the insertion portion 33. However, the disclosure is not limited to this. For example, as illustrated in FIG. 5, the escape space S2 may be formed by cutting out a part of the open end 41. Further, the escape space S2 may be formed by cutting out a part of the insertion portion 33 and a part of the open end 41.

In the above embodiment, the inner peripheral surface 64 of the fitting portion 62 is formed in a cylindrical shape having the inside diameter that is uniform along the axial direction. However, the disclosure is not limited to this. For example, the shape of the inner peripheral surface 64 may be a conical shape having the outside diameter increasing or decreasing from the first side toward the second side.

In the above embodiment, the shape of the gear housing 26 is a cylindrical shape opened rearward in the vehicle front-rear direction, and the tube housing 25 is provided as a cover. However, the disclosure is not limited to this. For example, the shape of the gear housing 26 may be a cylindrical shape opened forward in the vehicle front-rear direction, and the steering column 4 may further include a cover so as to close the opening of the gear housing 26 from the front side in the vehicle front-rear direction. Note that, in this case, the rear side in the vehicle front-rear direction is the first side, and the front side in the vehicle front-rear direction is the second side.

In the above embodiment, the steering column device 1 may constitute a steering unit for a steer-by-wire steering system in which power transmission between a steering unit to be steered by a driver and a turning unit configured to turn steered wheels in response to steering by the driver is cut off.

What is claimed is:

1. A steering column device comprising:
  a steering shaft to which a steering wheel is fixed; and
  a steering column configured to support the steering shaft such that the steering shaft is rotatable, wherein:
  the steering column includes
    a housing opened in an axial direction of the steering column,
    a cover configured to close an opening of the housing, and
    a sealing member configured to provide sealing between the housing and the cover;
  a first side in the axial direction of the steering column is a side where the housing is located relative to the cover, and a second side in the axial direction of the steering column is a side where the cover is located relative to the housing;
  the housing includes an inclined portion having an inclined surface with an inside diameter increasing from the first side to the second side, the inclined surface contacting the sealing member from the first side;
  the cover includes a facing portion having a facing surface contacting the sealing member from the second side, and an insertion portion having an outer peripheral surface contacting the sealing member from an inner peripheral side;
  the sealing member is accommodated in an accommodation space defined by the inclined surface, the facing surface, and the outer peripheral surface; and
  an escape space continuous with the accommodation space is provided between the housing and the cover, the escape space being located closer to the first side than the inclined surface is.

2. The steering column device according to claim 1, wherein the escape space is provided by cutting out a part of the insertion portion.

3. The steering column device according to claim 1, wherein a shape of the facing surface is a flat shape perpendicular to the axial direction.

4. The steering column device according to claim 1, wherein a shape of the outer peripheral surface is a cylindrical shape having an outside diameter that is uniform along the axial direction.

5. The steering column device according to claim 1, wherein a shape of the outer peripheral surface is a conical shape having an outside diameter decreasing from the first side toward the second side.

* * * * *